O. E. Bowen,

Coating Shingles.

No. 103,554.  Patented May 31, 1870.

United States Patent Office.

OTIS E. BOWEN, OF NEEDHAM, MASSACHUSETTS.

Letters Patent No. 103,554, dated May 31, 1870.

IMPROVED COMPOSITION FOR COATING SHINGLES AND CLAP-BOARDS.

The Schedule referred to in these Letters Patent and making part of the same.

I, OTIS E. BOWEN, of Needham, in the county of Norfolk and State of Massachusetts, have invented an Improvement with regard to Shingles, Clap-boards, and other Materials for covering the Roofs and Sides of Houses, of which the following is a specification.

My invention consists in dipping a shingle, clap-board, or other material for covering the roofs and sides of houses, in a composition, the ingredients of which are fully set forth below.

There are many compositions now in the market, generally composed partly of ground slate, which are smeared over shingled roofs for the purpose of preserving them from fire, rain, decay, &c.

I propose to dip the shingle or clap-board in the heated composition, allowing the surplus composition to run off. This process makes the outside of the shingle look smooth and shiny.

In the accompanying drawing—

Figure 1:
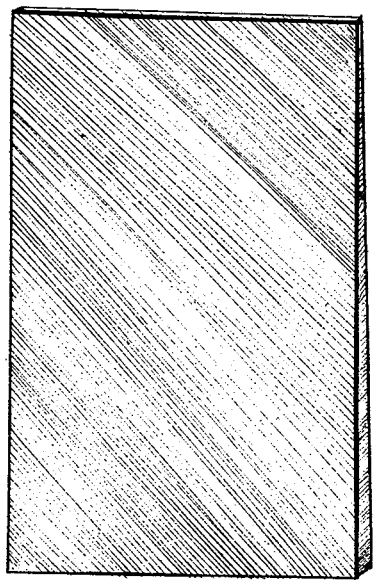
Figure 1 represents a common ordinary shingle.
Figure 2:
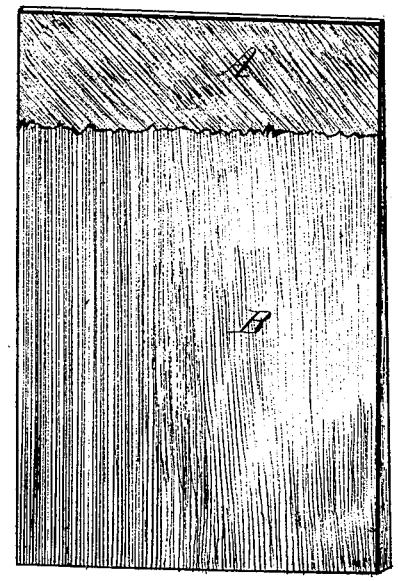
Figure 2 represents a common shingle, dipped by my process.

A is that part of the shingle left bare and uncovered.

B is that part which has been dipped and is covered with the composition.

My composition, which I claim as new, and in which I dip my shingles, is as follows, viz:

One pound rosin, two pounds pine tar, four pounds ground slate, quarter pound burnt senna, quarter pound Wing's metallic paint or burnt oxide of iron.

If it is considered best to use light-colored shingles, my composition would be as follows, viz:

Half-pound linseed oil or rosin oil, half pound rosin, two pounds ground marble, quarter pound barytes.

Any coloring matter can be used to suit the taste as to shade.

In immersing a shingle in this composition, it should remain immersed until the moisture all escapes and the liquid penetrates the wood.

My advantages over the old process of smearing a shingled roof are—

First, the shingles, when dipped beforehand, look handsomer and smoother than by the old process.

Second, the wood is preserved better than by the old process, inasmuch as all the cracks, crevices, and pores in the shingles are filled and saturated by dipping, while by the old process, oftentimes a small space will be left uncovered.

Third, I can cover as much or as little of my shingle as I choose.

Fourth, I can make my shingles or clap-boards of different colors.

Fifth, my process is more economical than the old process.

I claim as my invention—

The composition above described, of the ingredients and in the proportions set forth, for the purposes named in this specification.

OTIS E. BOWEN.

Witnesses:
  B. W. WILLIAMS,
  H. W. WILLIAMS.